(12) United States Patent
Dreiling

(10) Patent No.: US 7,702,754 B2
(45) Date of Patent: Apr. 20, 2010

(54) ENHANCED WIDGET ARCHITECTURE

(75) Inventor: Alexander Dreiling, Kelvin Grove (AU)

(73) Assignee: SAP AG, Walldorf (DE)

( * ) Notice: Subject to any disclaimer, the term of this patent is extended or adjusted under 35 U.S.C. 154(b) by 314 days.

(21) Appl. No.: 11/752,883

(22) Filed: May 23, 2007

(65) Prior Publication Data

US 2008/0294751 A1    Nov. 27, 2008

(51) Int. Cl.
G06F 15/16    (2006.01)
(52) U.S. Cl. ..................................... 709/219
(58) Field of Classification Search ................. 709/219
See application file for complete search history.

(56) References Cited

U.S. PATENT DOCUMENTS

| 5,392,400 | A * | 2/1995 | Berkowitz et al. | 709/203 |
| 6,219,712 | B1 * | 4/2001 | Mann et al. | 709/235 |
| 2003/0110233 | A1 * | 6/2003 | Prall | 709/213 |
| 2005/0273499 | A1 * | 12/2005 | Goodman et al. | 709/206 |
| 2006/0123462 | A1 * | 6/2006 | Lunt et al. | 726/1 |
| 2006/0287767 | A1 * | 12/2006 | Kraft | 700/236 |
| 2008/0222658 | A1 * | 9/2008 | Allen et al. | 719/320 |

OTHER PUBLICATIONS

'Web 2.0 for Grids and E-Science' [online]. Fox et al, 2007[ retrieved on Dec. 17, 2008]. Retrieved from the Internet: <URL: http://grids.ucs.indiana.edu/ptliupages/publications/INGRIDFinal.pdf>, 17 pages.

Dey et al., "A context-based infrastructure for smart environments," *Proceedings of the 1st International Workshop on Managing Interactions in Smart Environments*, 1999, Dublin, Ireland, 15 pages.

Leung and Cheung, "A CSCW framework for the flexible coupling of groupware widgets," *Fifth IEEE International Conference on Engineering of Complex Computer Systems*, 1999, Las Vegas, NV, 12 pages.

'Enterprise Mashup Widgets' [online]. Dreiling, 2007, [ retrieved on May 7, 2009]. Retrieved from the Internet: <URL: https://www.sdn.sap.com/irj/scn/weblogs?blog=/pub/wlg/5598>, 3 pages.

'Enterprise Mashup Widgets' [online]. Dreiling, 2007, [retrieved on May 7, 2009]. Retrieved from the Internet: <URL: https:www.sdn.sap.com/irj/scn/weblogs?blog=/pub/wlg/5700>, 2 pages.

* cited by examiner

*Primary Examiner*—Wing F Chan
*Assistant Examiner*—Tesfay Yohannes
(74) *Attorney, Agent, or Firm*—Fish & Richardson P.C.

(57) ABSTRACT

An enhanced widget architecture, in which a subscription request is transmitted from a widget to a broadcasting information source, thereby establishing a session, the subscription request identifying the widget and content. A subscription is registered at the broadcasting information source based upon the subscription request, and a service call is transmitted from the widget to the broadcasting information source, the service call effectuating a query for historical data associated with the content at the broadcasting information source. The historical data is received at the widget, updated data associated with the content is received at the broadcasting information source, and the updated data is iteratively transmitted form the broadcasting information source based upon the subscription being registered at the broadcasting information source.

20 Claims, 11 Drawing Sheets

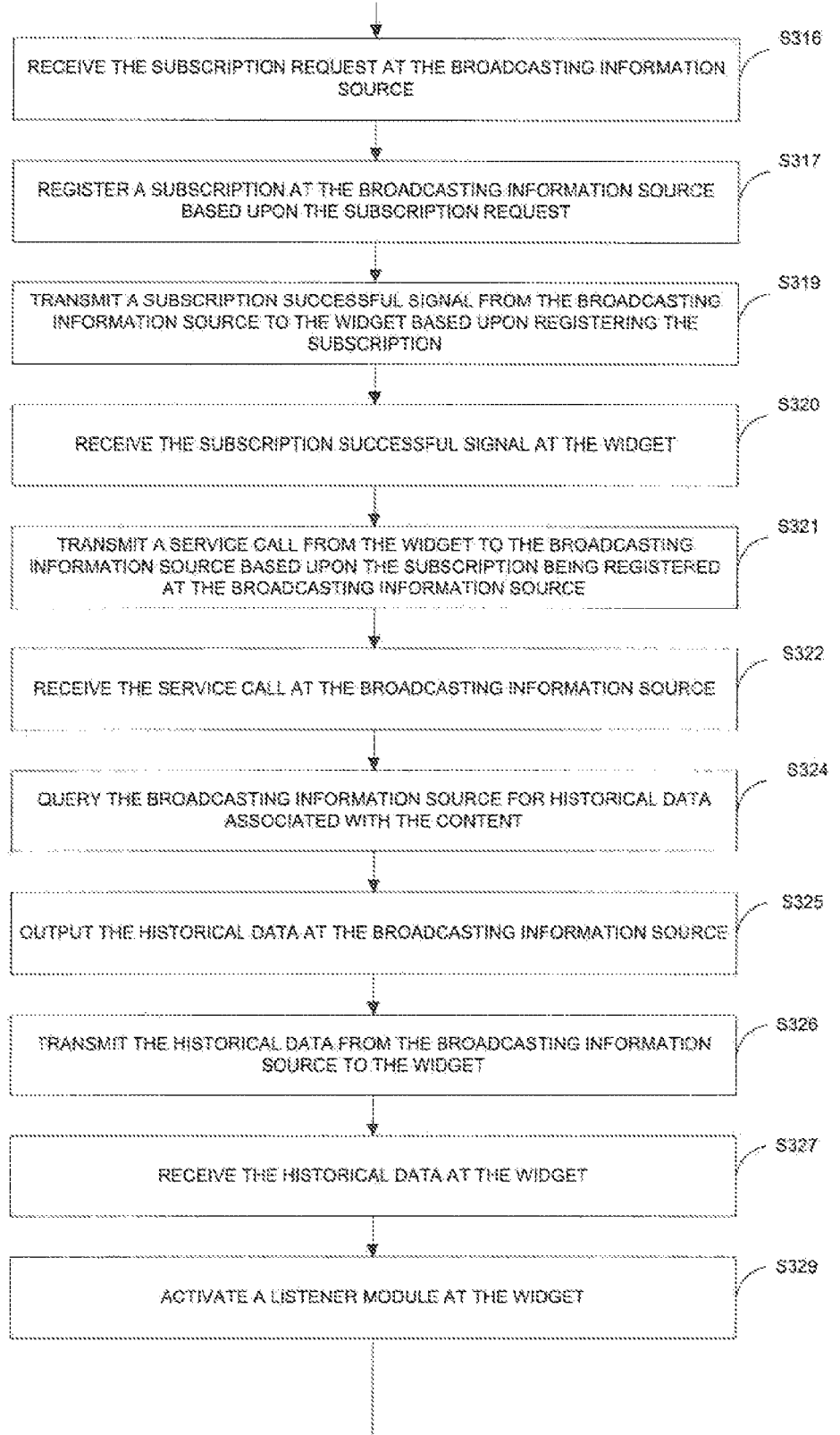

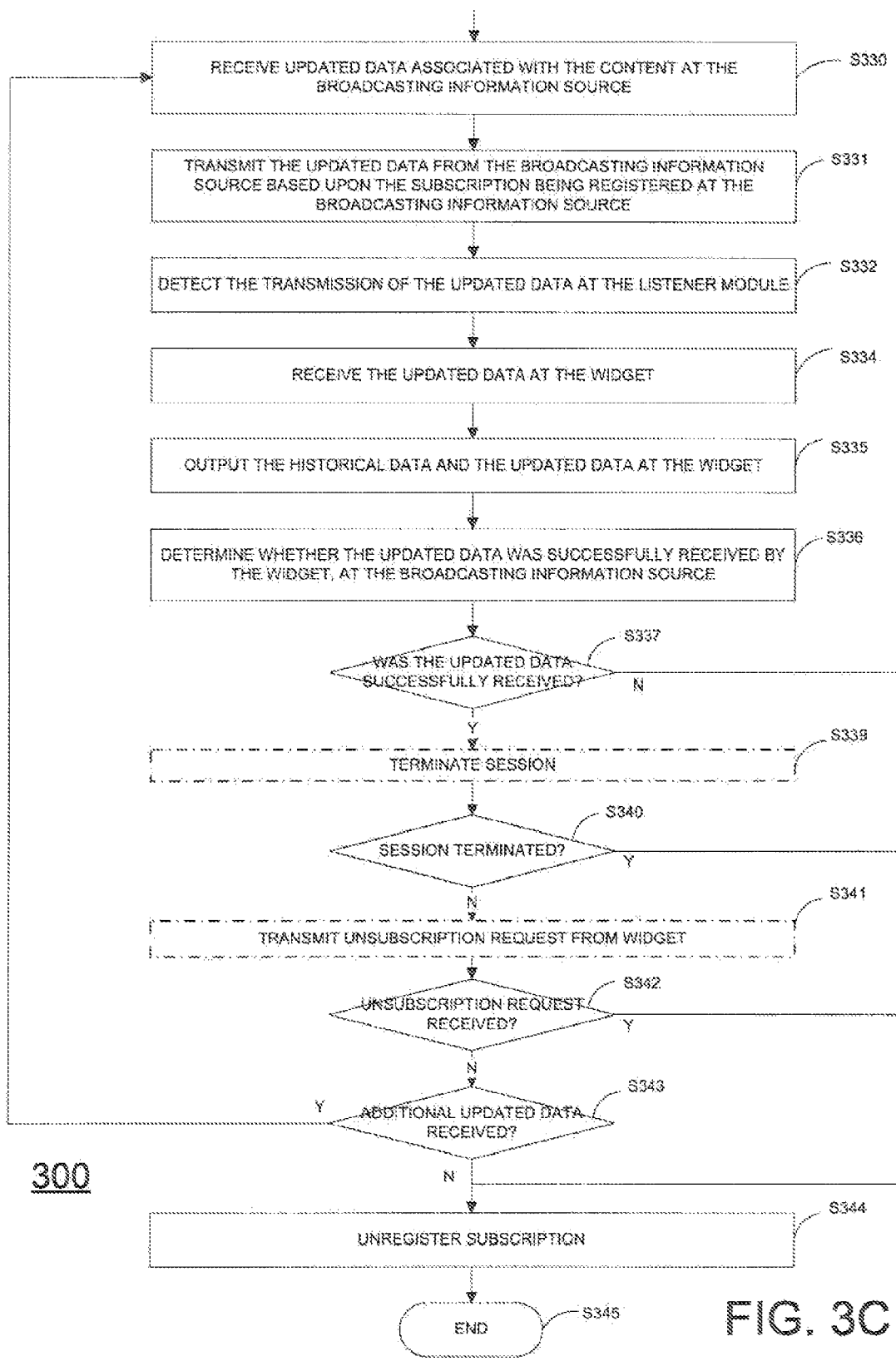

ENHANCED WIDGET ARCHITECTURE

FIELD

The present disclosure generally relates to computer applications, and at least one particular implementation relates to an enhanced widget architecture.

BACKGROUND

A widget (or "gadget") is an interactive desktop applet for providing a service to a user, such as by pulling information from the Internet and displaying it in a useful way, or by writing information to enterprise internal systems or public systems. This information could be, for example, current news or weather, dictionary definitions, maps, task or reminder data, or language-translated content.

A widget engine is a host application that provides the underlying functionality for a widget. Popular widget engines include the YAHOO!® widget engine, the SpringWidgets widget engine, the Kapsules widget engine, the GOOGLE DESKTOP™ widget engine, the KLIPFOLIO™ widget engine, and the WINDOWS VISTA® gadget engine.

SUMMARY

According to one general implementation, a subscription request is transmitted from a widget to a broadcasting information source, thereby establishing a session, the subscription request identifying the widget and content. A subscription is registered at the broadcasting information source based upon the subscription request, and a service call is transmitted from the widget to the broadcasting information source based upon the subscription being registered at the broadcasting information source, the service call effectuating a query for historical data associated with the content at the broadcasting information source. The historical data is received at the widget, updated data associated with the content is received at the broadcasting information source, and the updated data is iteratively transmitted from the broadcasting information source based upon the subscription being registered at the broadcasting information source. It is iteratively determined, at the broadcasting information source, whether the updated data was successfully received by the widget, and the subscription is unregistered at the broadcasting information source based upon determining that the updated data was not received successfully at the widget, upon termination of the session, or upon receiving an unsubscribe request. The historical data and the updated data are output at the widget.

Implementations may include one or more of the following features. For example, a determination may be made whether the historical data is stored at the broadcasting information, source, or the subscription request may be transmitted from the widget to the broadcasting information source based upon determining that the historical data is stored at the broadcasting information source. A user selection of the content may be received, where the subscription request may be transmitted to the broadcasting information source based upon receiving the user selection of the content. The broadcasting information source may be a back-end application. The historical data or the updated data may be sales data or contact management data. The session may be termination by the widget, or an the unsubscribe request may be transmitted from the widget to the broadcasting information source.

The subscription request may identify the widget based upon an internet protocol ("IP") address of the widget. Transmission of the updated data from, the broadcasting information source may fee listened for at the widget. The public information, source may be a financial market information source or a news information source, or the predetermined criteria may include a stock market metric. The content may identify a company, and the predetermined criteria may include a daily top gaining stock, a daily top losing stock, a top stock trade value, a top stock trade volume, or a top stock trade volume ratio.

According to another general implementation, a subscription request is received from a widget, thereby establishing a session the subscription request identifying the widget and content, registering a subscription based upon the subscription request, and receiving a service call from the widget, based upon the subscription being registered, the service call effectuating a query for historical data associated with the content. The historical data is transmitted to the widget, updated data associated wits, the content is received, and the updated data is iteratively transmitted to the widget based upon the subscription being registered. It is iteratively determined whether the updated data was successfully received by the widget, and the subscription is unregistered based upon determining that the updated data was not received successfully at the widget, upon termination of the session, or upon receiving an unsubscribe request.

According, to another general implementation, a system includes a widget and a broadcasting information source. The widget is configured to transmit a subscription request, the subscription request identifying the widget and content, to transmit a service call based upon a subscription being registered, the service call effectuating a query for historical data associated with the content, to receive the historical data at the widget, and output the historical data and updated data at the widget. The broadcasting information source is configured to receive the subscription request, thereby establishing a session, register me subscription based upon, the subscription request, and receive the service call. The broadcasting information source is further configured to receive the updated data associated with the content, iteratively transmit the updated data source based upon the subscription being registered, iteratively determine whether, the updated data was successfully received by the widget and unregister the subscription based upon determining that the updated data was not received successfully at the widget, upon termination of the session, or upon receiving an unsubscribe request.

According to another general implementation, a computer program product is tangibly embodied in a machine-readable storage medium. The computer program product includes instructions that, when read by a machine, operate to cause a data processing apparatus to receive a subscription request from a widget, thereby establishing a session, the subscription request identifying the widget and content, register a subscription based upon the subscription request, and receive a service call from the widget based upon the subscription being registered, the service call effectuating a query for historical data associated with the content. The computer program product further includes instructions that operate to cause the data processing apparatus to transmit the historical data to the widget, receive updated data associated with the content, iteratively transmit the updated data to the widget based upon the subscription being registered, iteratively determine whether the updated data was successfully received by the widget, and unregister the subscription based upon determining that the updated data was not received successfully at the widget, upon termination of the session, or upon receiving an unsubscribe request.

The details of one or more implementations are set forth in the accompanying drawings and the description, below. Other potential features and advantages of the disclosure will be apparent from the description and drawings and from the claims.

BRIEF DESCRIPTION OF THE DRAWINGS

FIGS. 3A to 3C illustrate an exemplary process for implementing the enhanced widget architecture.

Like reference numbers represent corresponding parts throughout.

DETAILED DESCRIPTION

Figure 1:
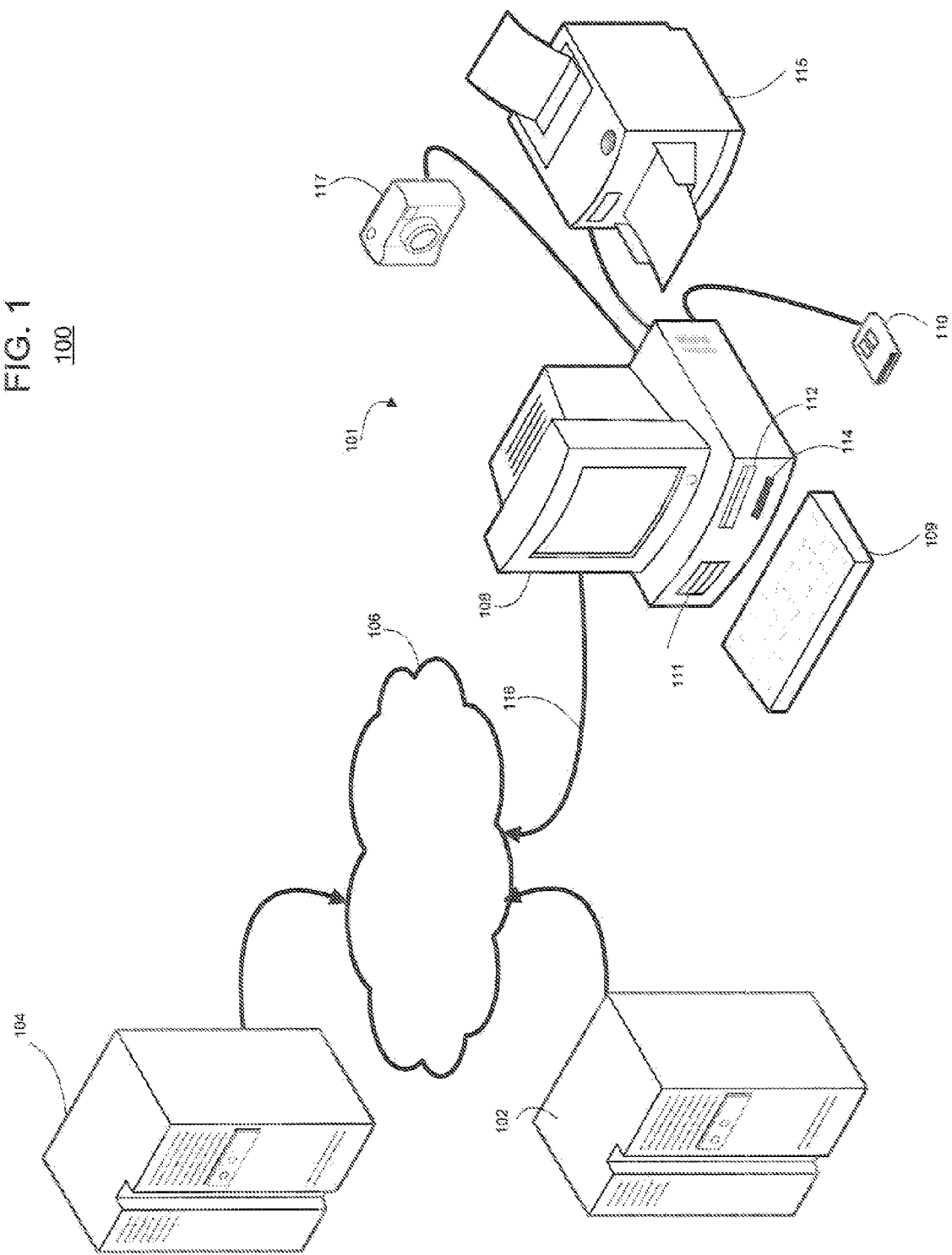
FIG. 1 depicts the exterior appearance of an exemplary system, according to one general implementation.

FIG. 1 depicts the exterior appearance of an example system 100, including a computer 101 executing or invoking a widget, a broadcasting information source 102, and a public information source 104, all connected by way of a network 106. Briefly, the widget is configured to transmit a subscription request, the subscription request identifying the widget and content, to transmit a service call based upon a subscription being registered, the service call effectuating a query for historical data associated with the content, to receive the historical data at the widget, and to output the historical data and updated data at the widget. The broadcasting information source 102 is configured to receive the subscription request, thereby establishing a session, to register the subscription based upon the subscription request, and to receive the service call. The broadcasting Information source 102 is further configured to receive the updated data associated with the content, to iteratively transmit the updated data source based upon the subscription being registered, to iteratively determine whether the updated data was successfully received by the widget, and to unregister the subscription based upon determining that the updated data was not received successfully at the widget, upon termination of the session, or upon receiving an unsubscribe request.

In more detail, the hardware environment of the computer 101 includes a display monitor 108 for displaying text and images to a user, a keyboard 109 for entering text data and user commands into the computer 101, a mouse 110 for pointing, selecting, and manipulating objects displayed on the display monitor 108, a fixed disk drive 111, a removable disk drive 112, a tape drive 114, a hardcopy output device 115, a computer network connection 116, and a digital input device 117.

The display, monitor 108 displays the graphics, images, and text that comprise the user interface for the software applications used by computer 101, as well as the operating system programs necessary to operate the computer 101. A user uses the keyboard 109 to enter commands and data to operate and control the computer operating system programs as well as the widget and other application programs. The user uses the mouse 110 to select and manipulate graphics and text objects displayed on the display monitor 108 as part of the interaction with and control of the computer 101 and applications running on the computer 101. The mouse 110 is any type of pointing device, and may be a joystick, a trackball, a touch-pad, or other pointing device. Furthermore, the digital input device 117 allows the computer 101 to capture digital images, and may be a scanner, a digital camera, a digital video camera, or other digital input device. Software used to provide for the enhanced widget architecture is stored, locally on computer readable memory media, such as the fixed disk drive 111.

In a further implementation, the fixed disk drive 111 itself may include a number of physical drive units, such as a redundant array of independent disks ("RAID"), or may be a disk drive farm or a disk array that is physically located in a separate computing unit. Such computer readable memory media allow the computer 101 to access computer-executable process steps, application programs and the like, stored on removable and non-removable memory media.

The wireless or wireline computer network, connection 116 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 106 may be one or more of a LAN network, a corporate or government WAN network, the Internet, or other network. The computer 101 is directly or indirectly coupled to the broadcasting information source 102, and the public information source 104, so as to effectuate unidirectional or bidirectional transmission of data between the computer 101, the broadcasting information source 102, and/or the public information source 104.

The computer network connection 116 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wideband ("UWB") wireless connector, a time-modulated ultra wide band ("TM-UWB") wireless connector, or other wireless connector. Example wireline connectors Include, for example, a IEEE®-1394 FIREWIRE® connector, a Universal Serial Bus ("USB") connector, a serial port connector, a parallel port connector, or other wireline connector.

The removable disk drive 112 is a removable storage device that is used to off-load data from the computer 101 or upload data onto the computer 101. The removable disk drive 112 may be a floppy disk drive, an IOMEGA® ZIP® drive, a-compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable "DVD-RW" or "DVD+RW"), or DVD-RAM. Operating system programs, applications, and various data files, are stored on disks, which are stored on the fixed disk drive 111 or on removable media for the removable disk drive 112.

The tape drive 114 is a tape storage device that is used to off-load data from the computer 101 or to upload data onto the computer 101. The tape drive 114 may be a quarter-inch cartridge ("QIC"), 4 mm digital audio tape ("DAT"), 8 mm digital linear tape ("DLT") drive, or other type of tape.

The hardcopy output device 115 provides an output function for the operating system programs and applications. The hardcopy output device 115 may be a printer or any output device that produces tangible output objects, including textual or image data or graphical representations of textual or image data. While the hardcopy output device 115 is depicted as being directly connected to the computer 101, it need not be. For instance, the hardcopy output-device 115 may be connected to computer 101 via a network interface, such as a wireline or wireless network.

The broadcasting information source 102 exists remotely on the network 106, and includes one or more networked data server devices or servers. The broadcasting information source 102 executes software which services requests sent by the computer 101, where the broadcasting information source 102 may include a server farm, a storage farm, or a storage server. In an alternate implementation, the broadcasting information source 102 is omitted, and the functions associated with the broadcasting information source 102 are actually performed by the computer 101 and/or the public information source 104.

Furthermore, although the computer 101 is illustrated in FIG. 1 as a desktop PC, in further implementation the computer 101 may be a laptop, a workstation, a midrange computer, a mainframe, an embedded system, telephone, a handheld or tablet computer, a PDA, or other type of computer.

Although further description of the components which make up the broadcasting information source 102, and the public information source 104 is omitted for the sake of brevity, it suffices to say that the hardware environments of the computer or individual networked computers which make up the broadcasting information source 102, and/or the public information source 104 are similar to that of the exemplary hardware environment described herein with regard to the computer 101. In an alternate implementation, the functions of any of the computer 101, the broadcasting information source 102, the public information source 104 are consolidated into a single or multiple, combined hardware environments. For instance, a single public computer may be first used by a hacker, then subsequently used by a legitimate web user.

Figure 2:
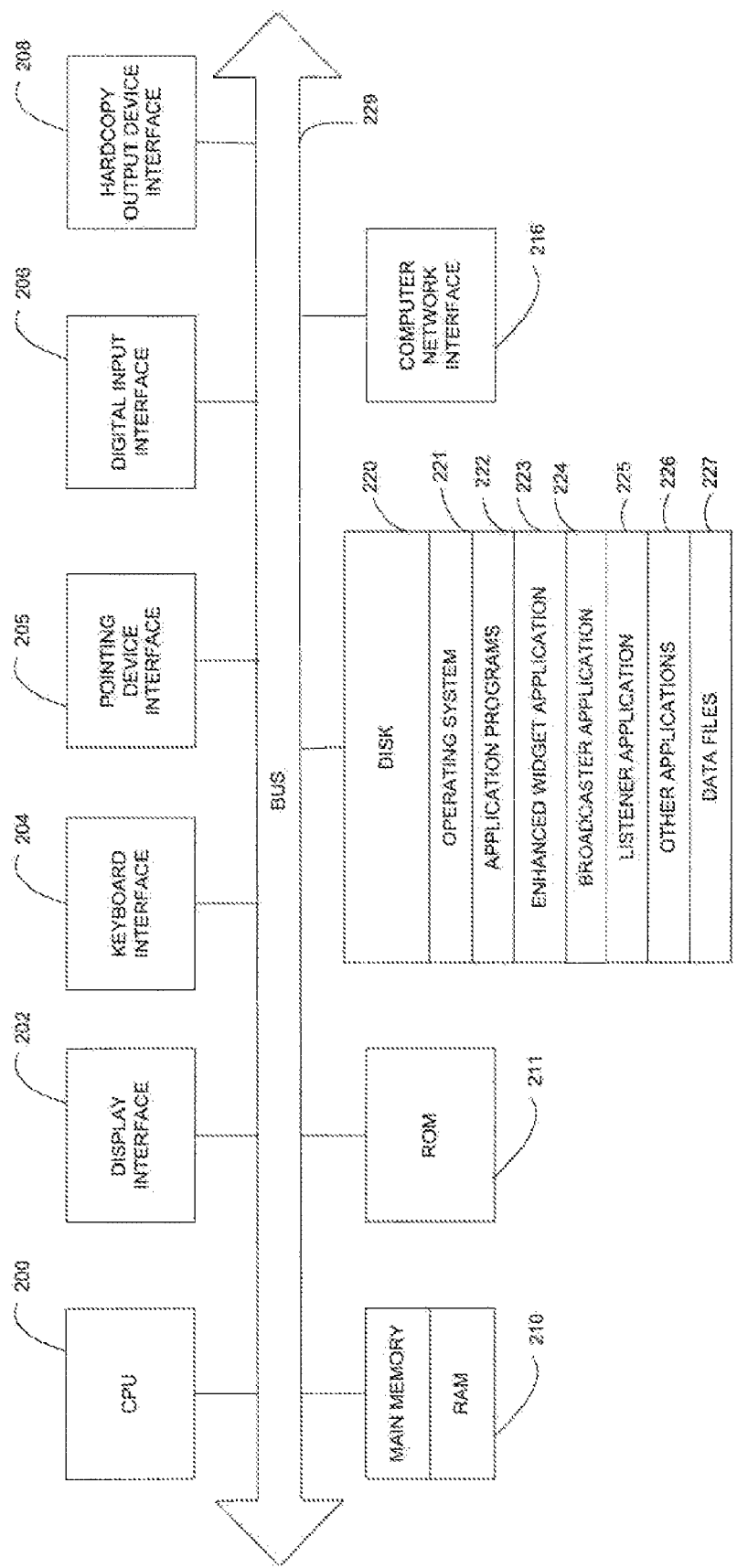
FIG. 2 depicts an exemplary internal architecture of one computer depicted in FIG. 1.

FIG. 2 depicts an example of an internal architecture of the computer 101. The computing environment includes a computer central, processing unit ("CPU") 200 where the computer instructions that comprise an operating system or an application are processed; a display interface 202 which provides a communication interface and processing functions for rendering graphics, images, and texts on the display monitor 108; a keyboard, interface 204 which provides a communication interface to the keyboard 109; a pointing device interface 205 which provides a communication interface to the mouse 110 or an equivalent pointing device; a digital input interface 206 which provides a communication interface to the digital input device 117; a hardcopy output device interlace 208 which provides a communication interface to the hardcopy output device 115; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 109 are stored, in a non-volatile memory device; a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including widget 223, broadcaster application 224, listener application 225, and other applications 226 as necessary) and data files 227 are stored; and a computer network interface 216 which provides a communication interface to the network 106 over the computer network connection 116. The constituent devices and the computer CPU 200 communicate with each other over the computer bus 229.

Briefly, a computer program product is tangibly embodied in disk 220, a machine-readable storage medium. The computer program product includes instructions that, when read by a machine, operate to cause a data processing apparatus to receive a subscription request from a widget, thereby establishing a session, the subscription request identifying the widget, and content, register a subscription based upon the subscription request, and receive a service call from the widget based upon substitution being registered, the service call effectuating a query for historical data associated with the content. The computer program product further includes instructions that operate to cause the data processing apparatus to transmit the historical data to the widget, receive updated data associated with, the content, iteratively transmit the updated data to the widget based upon the subscription being registered, iteratively determine, whether the updated data was successfully received by the widget, and unregister the subscription based upon determining that the updated data was not received successfully at the widget, upon, termination of the session, or upon receiving an unsubscribe request.

The RAM 210 interfaces with the computer bus 229 so as to provide quick RAM storage to the computer CPU 200 during the execution of software programs such as the operating system application programs, and device drivers. More specifically, the computer CPU 200 loads computer-executable process steps from, the fixed disk drive 111 or other memory media into a field of the RAM 210 in order to execute software programs. Data is stored in the RAM 210, where the data is accessed by the computer CPU 200 during execution.

Also shown in FIG. 2, the computer 101 stores computer-executable code for a operating system 221, and application programs 222 such as word processing, spreadsheet, presentation, gaming, or other applications. Although it is possible to provide for the enhanced widget architecture using the above-described implementation, it is also possible to implement the functions according to the present disclosure as a dynamic link library ("DLL"), or as a plug-in to other application programs such as Internet web-browser such as the MICROSOFT® Internet Explorer web browser.

The computer CPU 200 is one of a number of high-performance computer processors, including an INTEL® or AMD® processor, a POWERPC® processor, a MIPS® reduced instruction-set computer ("RISC") processor, a SPARC® processor, an ACORN® RISC Machine ("ARM®") architecture processor, a HP ALPHASERVER® processor or a proprietary computer processor for a mainframe, hi an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE™, or MICROSOFT®.NET Compact.

Although further description of the internal architecture of the broadcasting information source 102 and public information source 104 is omitted for the sake of brevity, it suffices to say that the architectures of those computers are substantially similar to that of the computer 101. Notably, however, and as described in further detail below, the broadcasting information source 102 also includes a broadcaster. In an alternate implementation, where the functions of the computer 101 and the broadcasting information source 104 are combined in a single, combined hardware environment, the internal architecture is combined or duplicated.

FIGS. 1 and 2 illustrate one possible implementation of a computing system that executes program code, or program or process steps, configured to effectuate the enhanced widget architecture, other types of computers may also be used as well.

Using the enhanced widget architecture, a widget is able to access data using a request/response approach, in which data is regularly requested and received from a public information source. Furthermore, the widget is also able to access data using a publish/subscribe approach, in which a subscription is registered with a broadcasting information source and data is pushed from the broadcasting information source based upon the subscription.

The request/response approach is well suited for situations where content changes frequently, such as news content, or where content must be contextualized, such as a mapping application that responds to a request including an address by producing a map. In situations where stored data changes less frequently or is nearly static, the publish/subscribe approach is well suited to provide access to that data. When data is updated, the updated data itself (and not necessarily the entire data history) is broadcast to a subscribed widget.

According to one general implementation, the enhanced widget architecture is thus able to access data based upon the publish/subscribe approach alone, or based upon a mash-up of the request/response approach and the publish/subscribe approach. To its advantage, the enhanced widget architecture does not overburden internal system resources with repeated, computationally-expensive data queries, since the publish/subscribe approach does not regularly request updated data, and since pushes of the updated data to the widget do not haw to include all historical data.

The enhanced widget architecture uses a widget engine that can receive information using one or more of the above-described data access approaches. For example, if certain data rarely changes, then the widget engine can access that data using the publish/subscribe approach. If the data frequently changes (e.g. the data is news or financial market information) or requires contextualization (e.g. the data is address information to be mapped), however, then the widget engine can implement the request/response approach.

The request/response approach can further be used for data queries to enterprise-external information sources, and the publish/subscribe approach, can be used for enterprise-internal information sources. In this context, the broadcasting information source 102 may be seen as an enterprise-internal information source storing infrequently-updated information, and the public information source 104 may be seen as an enterprise external information source storing frequently updated information.

Figure 3A:
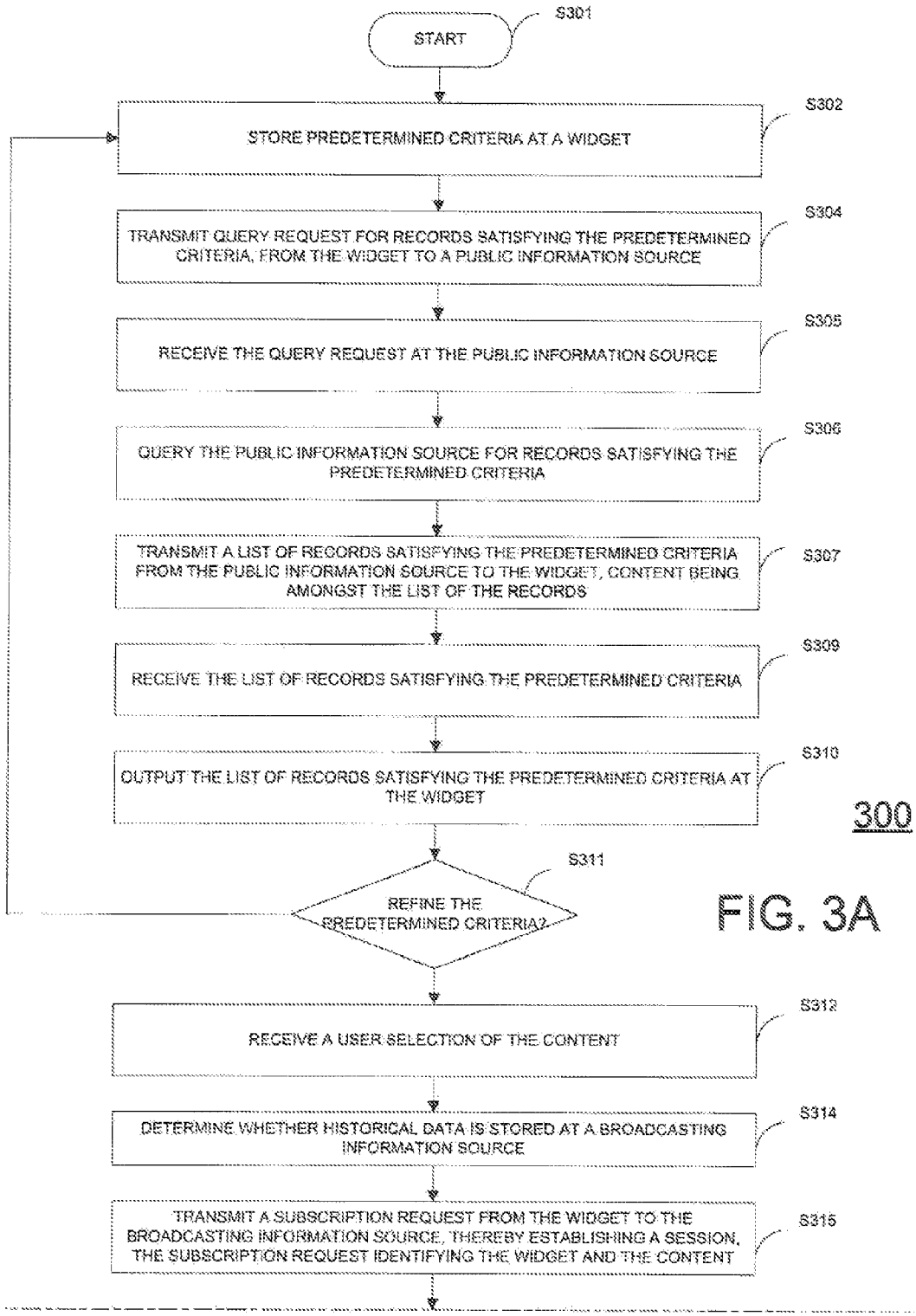
Figure 4:
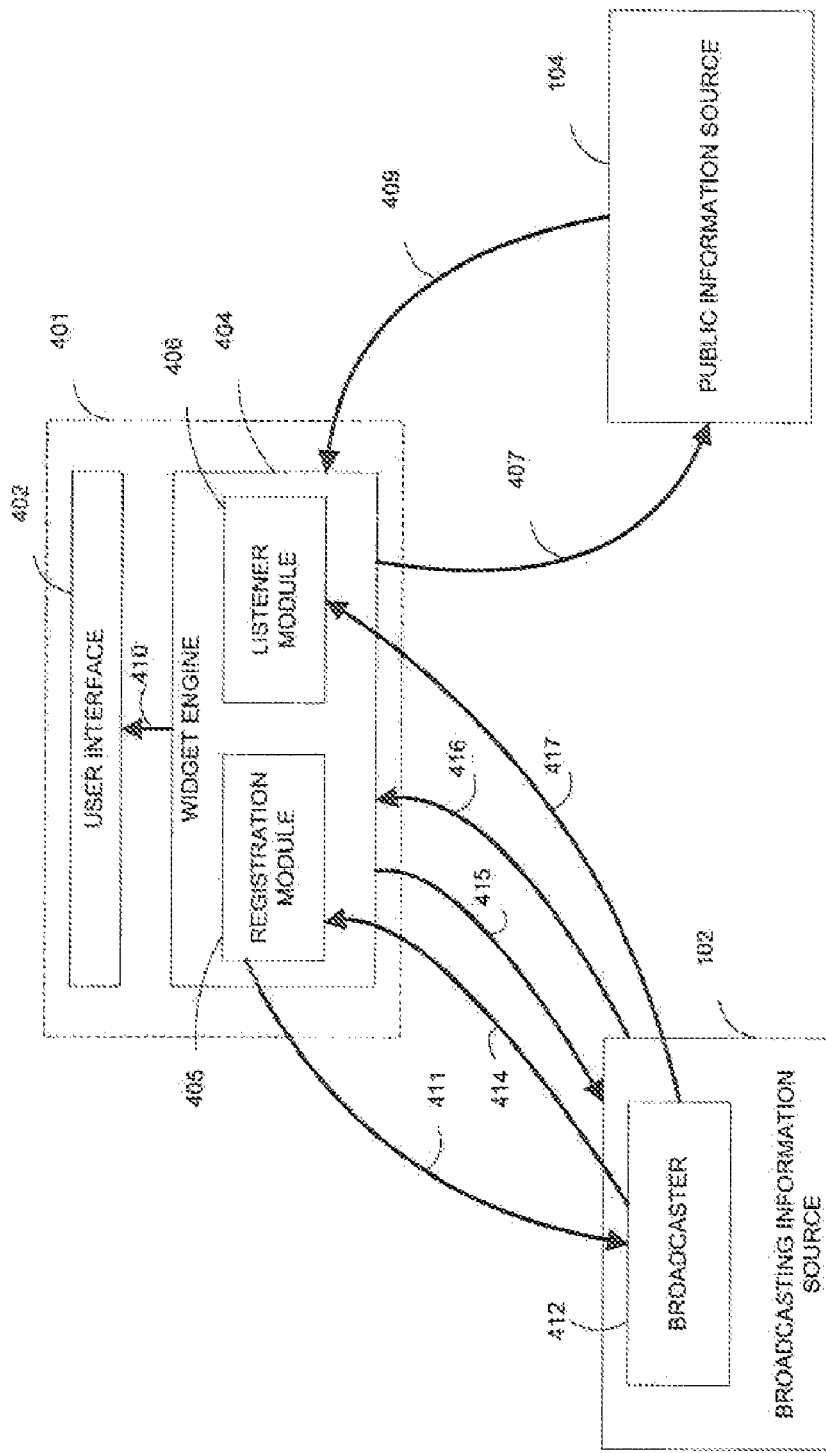
FIG. 4 is a block-diagram illustrating an exemplary data flow between components, using the exemplary process illustrated in FIGS. 3A to 3C.

FIGS. 3A to 3C flowchart an exemplary process 300 for implementing the enhanced widget architecture. Further context to the process 300 is provided by referencing FIGS. 4 and 5, which illustrate a data flow block diagram and a swim diagram of the process 300, respectively, Briefly, the process 300 includes transmitting a subscription request from a widget to a broadcasting information source, thereby establishing a session, the subscription request identifying the widget and content. A subscription is registered at the broadcasting information source based upon the subscription request, and a service call is transmitted from the widget to the broadcasting information source based upon the subscription being registered at the broadcasting information source, the service call effectuating a query for historical data associated with the content at the broadcasting information source. The historical data is received at the widget, updated, data associated with the content is received at the broadcasting information source, and the updated data is iteratively transmitted from the broadcasting information source based upon the subscription being registered at the broadcasting information source. It is iteratively determined, at the broadcasting information source, whether the updated data was successfully received by the widget, the subscription is unregistered at the broadcasting information source based upon determining that the updated data was not received successfully at the widget, upon termination of the session, or upon receiving an unsubscribe request, and the historical data and the updated data are output at the widget.

Initially, it is noted that the enhanced widget architecture may be used to implement the publish/subscribe approach alone, or as a mash-up implementation of both the publish/subscribe approach and the request/response approach. As a whole, for example, FIGS. 3A to 3C illustrate a mash-up implementation which selects a list of records based upon predetermined criteria via the request/response approach, the list of records including content, then retrieves historical and updated data relating to the content via the publish/subscribe approach. In an implementation which does not use the mash-up, for example where content is already identified, the portions of the process 300 referring to the request/response approach (particularly S302 to S311) may be partially or entirely omitted.

The process 300 begins (S301) when predetermined criteria are stored at a widget 401, (S302). Since the widget 401 pulls information via the network 106 and presents the information in a useful way, the predetermined criteria are used as a basis to identify records or items for display. For example, if the widget 401 is a business widget, a user may be interested in viewing information about a company, thereby predetermining or predefining criteria that select a list of companies to display or query. In such a case, the predetermined criteria may include a stock market metric, such as a daily top gaining stock, a daily top losing stock, a top stock trade value, a top stock trade volume, a top stock trade volume ratio, or other metrics.

Since widgets are used to display all sorts of information, the predetermined criteria may define any number or type of conditions. A weather widget, for example, may predetermine time or date criteria, location criteria, climate-related criteria, or outdoor activity criteria. A media player widget may predetermine a media type, a media genre, a play length, or a popularity index. A game widget may predetermine a difficulty level, a game type, an age bracket, or system capabilities. A news widget may predetermine user interests, a location, a breaking news preference, or a news type. An email widget may predetermine user identification, information or a spam sender list. A recipe widget may include ingredients, a food restriction, a preferred food type, a meal type, upcoming holiday data, event information, or a guest invitation list.

According to one exemplary implementation, the widget 401 includes a user interface 402 and a widget engine 404, and is executed on a computer such as the computer 101. As described in further detail below, the widget engine further includes a registration module 405 and a listener module 406. The widget 401 uses the request/response approach to retrieve information from the public information source 104, storing the predetermined criteria on a storage, medium, such as fixed disk drive 111 of the computer 101.

The predetermined criteria may be manually entered by a user, for example using the keyboard 109, or the predetermined criteria may be automatically generated or downloaded onto the computer 101. By 'predetermined,' it is intended that the criteria are stored for use by the widget prior to transmitting a query request for data relating to the criteria. It may simply suffice that the criteria be predetermined, however, and not necessarily stored.

A query request 407 is transmitted to effectuate a query for records satisfying the predetermined criteria (S304). The query request is transmitted from the widget 401 to the public information source 104, which may be a financial market information source, a news information source, or other information source with frequently-updated data. If the widget 401 is the business widget described above, the query request 407 may be transmitted from the computer 101 to the public information source 104 requesting a list of top gaining stocks for a predetermined time period. Stock market information, is a type of information which is well suited for retrieval via the request/response approach, since it is constantly changing. In another example implementation that does not implement the request/response approach, or that is configured to be the recipient of such a request, the query request is not transmitted.

Each transmitted query request effectuates the generation of a query response 409. For example, if the query request 407 relates to a sales order report, the query request effectuates the generation of the query response 409 which details a full order history (including historical data 502 from external information source 501) up to the moment that the query response 409 is transmitted. Using the request/response approach, the query response 409 does not transmit updated data (such, as updated data 504) which is received at the public information source 104 after transmission of the query response 409. In order to provide access to near real-time data, query requests are repeatedly generated (illustrated as repeated query request 511), resulting in the re-occurrence of similar computationally-expensive queries, and the retransmission of query responses including only a marginal amount of additional data.

The implementation of the request/response approach to access data may cause a substantial burden to system resources for many business application backend servers. Near real-time data access may also be provided, however, if the widget 401 is configured to access data by way of the publish/subscribe approach. Using the publish/subscribe approach, updated data generated at the backend server is pushed to the subscribing widget 401 after the transmission of historical data 506, without the use of repeated query requests.

The query request 407 is received at the public information source 104 (S305), and the public information source 104 is queried for records satisfying the predetermined criteria (S306). For example, the public information source 104 may query a financial database to identify companies that meet the predetermined stock market metric, or a news database to identifies stories that relate to a predetermined locality. In another example implementation that does not implement the request/response approach, or that is configured to send query requests, the query request is not received, and/or the public information source 104 is not queried.

A list of records satisfying the predetermined criteria is transmitted, from the public, information source 104 to the widget 401 (S307). As described more fully below, the list of the records is included in the query response 409, and includes content which provides the basis for a later subscription request. If the predetermined criteria relates to a stock market metric, a list of companies matching the stock market metric is transmitted from the public information source 104 to the widget engine 404. If the list of records satisfying the predetermined criteria includes records A, B and C and the widget 401 is automatically or manually configured to gather additional data regarding records B and C, then records B and C are considered the content.

A list of records may include thousands of records, one record, or no records. The content may include all records on the list, some subset of the records on the list, or none of the records. In another example implementation that does not implement the request/response approach, or that is configured to receive the list of records, the list of records is not transmitted from the public information source 104 to the widget 401.

The list of records satisfying the predetermined criteria is received (S309) and output at the widget (S310). This occurs, for example, when a list of records transmitted from the public information source 104 is received at the widget engine, and is transmitted as a signal 410 from the widget engine 404 to the user interface 402 for rendering. Once received, the user interface 402 outputs the received list of records satisfying the predetermined criteria. Such an output may occur when a list of top gaining stocks is displayed on display 108, printed via hardcopy output device 115, or recited via a speaker on the computer 101. In another example implementation that does not implement the request/response approach, or that is configured to merely transmit the list of records, the list of records is not received and/or output.

If the predetermined criteria are to be refined (S311), refined predetermined criteria are stored at the widget (S302). Refinement may be desired, for example, when too few or too many records are returned in the list of records. For example, if the widget is a weather widget and the predetermined criteria relate to identifying those ski resorts within 5 miles which have received 1 meter or more of snow in the last 24 hours in the summer, it is likely that the list of records many not include any records at all. In this regard, the predetermined criteria may be refined to include less or more records. The refinement of the predetermined criteria may occur, for example, when the user types in new or altered criteria into the computer 101 using the keyboard 109, thereby altering the predetermined criteria that were previously stored on the fixed disk drive 111.

The decision to refine the predetermined criteria may be an automatic decision or a manual decision. By 'refined,' it is intended that the predetermined criteria may be changed to broaden or narrow the scope of records that satisfy the criteria, or the previously-applied predetermined criteria may be deleted, replaced, or new additional criteria added. Refinement of the predetermined criteria may also include storing predetermined criteria to be used as a basis bar a query for an entirely different public information source, where the user is presented with lists of records from more than one public information source as a basis for selecting the content. In another example implementation, such as an implementation which does not implement the request/response approach, where the content is already identified, or where the predetermined criteria are intended to be static, predetermined criteria arc not capable of being refined.

If the predetermined criteria are not to be refined (S311), a user selection of the content is received (S312). The selection of content may also occur as a first step of the process 301 if desired, for example where the content is already identified. In this case, the portions of the process 300 referring to the request/response approach (particularly S302 to S311) may be partially or entirely omitted.

The selection of the content may occur via the manual or automatic selection of a record or records on the list of records satisfying the predetermined criteria, via a direct entry of the content into the computer using the keyboard 109 or the mouse 110. Since the content may be automatically selected, the user selection of the content may be omitted (S312). Such an implementation occurs, for example, if the widget 401 is configured to subscribe, to the same, preset content upon each invocation. A widget executing on a company's computer, for example, may be configured to subscribe to infrequently-updated data, such as an organizational hierarchy chart, upon each load of the widget 401.

It is determined whether historical data is stored at a broadcasting information source 102 (S314). Prior to subscribing to a broadcasting information source 102, it may be beneficial to determine whether the broadcasting information source 102 has access to data relating to indentified content. Such a determination may occur, for example, if the widget 401 directly queries the broadcasting information source 102 to determine if historical data is stored therein, if the widget 401 accesses a database on the computer 101 which identifies the data stored on the broadcasting information source 102, or by estimating or predicting the content of the broadcasting information source 102. Historical data refers to data, such as data 506, relating the content which is stored on or is otherwise accessible to the broadcasting information source 102 prior to the transmission of data from the broadcasting information source 102 to the widget 401. A query to determine fee existence of historical data may be less computationally expensive that subscribing then subscribing to a broadcasting information source 102 that turns out not to store historical data.

The broadcasting information source may execute a back-end application. The historical, data may be sales data, contact management data, weather data, company data, news data, media-related data, or any other data. In another example implementation, for example when it is certain that the widget 401 will subscribe to the broadcasting information source, the determination of whether historical data is stored at the broadcasting information source 102 does not occur.

A subscription request 411 is transmitted from the registration module 405 to a broadcaster 412 on the broadcasting information source 102, thereby establishing a session. The subscription request 411 identifies the widget 401 and the content (S315). The subscription request 411 may identify the widget 401 based upon an IP or other address of the widget 401, or by another unique identifier such as a widget name or a user name, or by a unique communication channel. In one example, the subscription request is formatted using XML, and is transmitted from the computer 101 to the broadcasting information source 102, via the network 106.

A session is a lasting connection using a session layer of a network protocol or a time-limited connection, involving the exchange of data between the broadcasting information source and the widget 401. In the case where the session is not implemented using a formal session layer, the session is maintained by the widget 401, for example by using a session token or cookie which identifies the state of the session. A session token is a unique identifier mat is generated and sent, for example, from the computer 101 to the broadcasting information source 102, to identify the current session. The broadcasting information source 102 stores and sends the token as data in a query or as a cookie. By subscribing to the broadcasting information source 102 using a unique identifier, such as an IP address, the widget engine 404 effectuates the registration of a content subscription which is valid for the duration of the session.

With regard to the network protocol which provides communication between the computer 101, the broadcasting information source 102, and the public information source 104, the protocol should allow for registration of a widget engine 404, for the subscription of content, for pushing of data from the broadcasting information source to a widget engine 404. Furthermore, the protocol should provide feedback to the broadcasting information source 102 concerning the success or failure of a data push to the widget engine 404, and for appropriate security mechanisms for authentication and communication. Moreover, the network protocol should provide an appropriate facility to reach the widget engine 404, on top of TCP/IP.

The subscription request 411 may be transmitted from the widget 401 to the broadcasting information source based upon determining (at S314) that the historical data is stored at the broadcasting information source 102, or based upon receiving (at S312) the user selection of the content. For example, the user may input content that they are interested in receiving updated information for, using the keyboard 109 or the mouse 110, where the subscription request 411 is transmitted based upon the receipt of the input. Alternatively, it may be determined that historical data is stored at the broadcasting information, source 102, thereby prompting the transmission of the subscription request 411.

In another example implementation, for example when the subscription request 411 is sent without manual selection of a user or regardless of whether historical data is stored at the broadcasting information source 102, the subscription request 411 is not transmitted based upon determining that the historical data is stored at the broadcasting information source 102, or based, upon receiving the user selection of the content.

The subscription request 411 is received at the broadcasting information source 102 (S316). In an alternate implementation that is configured to transmit the subscription request 411, the subscription request 411 is not received. A subscription is registered at the broadcasting information source 102 based upon the subscription request 411 (S317). For instance, the broadcasting information source 102 stores, as subscription, a record of the content and information uniquely identifying the widget 401 which is subscribed to receive updated data relating to the content. Accordingly, the subscription effectuates the transmission of updated data relating to the content from the broadcasting information source 102 based upon the subscription request 411 from the widget 401 identifying the content and providing a unique identifier to address the transmission of updated data. The registration of a subscription may also, for example, effectuate the establishment of a persistent connection between the broadcasting information source 102 and the computer 101, or may cause any other action to occur which associates the widget 401 issuing the subscription request with the content, at the broadcasting information source 102.

A subscription successful signal 414 is transmitted from the broadcasting information source to the registration module 405 of the widget 401 based upon registering the subscription (S319). To avoid the transmission of repeated subscription requests, or to merely acknowledge the successful registration of the subscription, the broadcasting information source 102 may send a subscription successful signal acknowledging the successful registration of the subscription to the computer 101.

In turn, the widget 401 may ignore or discard tire subscription successful signal 414, or may use the signal 414 as a basis for not sending further subscription requests, for updating a counter or a database, or for confirming the establishment of the session. In another example implementation, such as where the broadcasting information source 102 determines that a subscription successful signal 414 will be ignored or discarded or where the implementation is configured to receive the subscription successful signal 414, the subscription successful signal 414 is not transmitted.

The subscription successful signal 414 is received at the widget (S320). As above, in another example implementation, such as where the broadcasting information source 102 does not transmit a subscription successful signal 414 or where implementation is configured to merely transmit the subscription successful signal 414, the subscription successful signal is not received.

A service call 415 is transmuted from the widget 401 to the broadcasting information source 102 based upon the subscription being registered at the broadcasting information source 102, the service call 415 effectuating a query for historical data associated with the content at the broadcasting information source 102 (S321). Put another way, the service call 415 provides for a first-time data fetch from the broadcasting information source 102.

While the subscription effectuates the transmission of updated data, commencing upon the registration of the subscription, the service call 415 effectuates the transmission of historical data accessible to the broadcasting information source 102 prior to the registration of the subscription. In another example implementation, such as where the widget 401 is configured to merely receive updated data, or where implementation is configured to receive service calls, the service call is not transmitted from the widget 401.

The service call 415 is received at the broadcasting information source 102 (S322). As indicated above, if service calls are not transmitted, or if the implementation is not configured to transmits a service call 415, the service call is not received at the broadcasting information source 102.

The broadcasting information source 102 is queried for historical data 506 associated with the content (S324), and the historical data is output at the broadcasting information source 102 (S325). In particular, the broadcasting information source 102 submits a precise request for information to a database, for example by way of keywords combined with Boolean operators, to extracts historical data relating to the content. In an example implementation, such as where the widget ignores the historical data or where implementation is configured to merely receive the results of the query, the query for historical data and/or the output of the historical data are not performed.

The historical data 506 is transmitted from the broadcasting information source 102 to the widget 401 (S326), and is received at the widget 401 (S327). If the widget, is configured to ignore historical data or only receive updated data, the historical data may not be transmitted and/or received. The listener module 406 is activated at the widget 401, the listener module 406 detecting pushes of updated data from the broadcaster 412 (S329). The activation of the listener module 405 is dependent upon the existence of such a module within the widget engine 404.

Updated data 417 associated with the content is received at the broadcasting information source 102 (S330). The updated data 417 includes, at various times, data 507 to 509. The updated data 417 may be received, for example, from an information source 501 external to the broadcasting information source 102, or the updated data 417 may be generated by the broadcasting information source 102 itself.

The updated data 417 is iteratively transmitted from the broadcasting information source 102 based upon the subscription being registered at the broadcasting information source 102 (S331). Iterative transmission refers to the repeated transmission of updated data, as updated data is received by the broadcasting information source 102, shown in FIG. 3 as a process connection between the determination of whether updated data is to be received (S343) with the receipt of the additional updated data (S330).

The transmission of the updated data 417 is detected at the listener module 406 (S332). In an alternate example implementation, such as where the widget engine 404 does not include a listener module 406, the updated data is not detected at the listener module. The updated data is received at the widget 401 (S334). In an example implementation that is configured to merely transmits updated data, the updated data is not received.

The historical data 506 and the updated data are output at the widget 401 (S335). In particular, the historical data 506 and/or the updated data are received at the widget engine, which renders or updates the user interface to include the data. The historical data and the updated data may be output at the same time, or as they are a received at the widget.

It is iteratively determined, at the broadcasting information source 102, whether the updated data was successfully received by the widget 401 (S336). The determination of whether the updated data was successfully received by the widget 401 is performed by way of a protocol, which provides information back to the broadcasting information source 102, or by the receipt of a data successfully received signal 510. If it is determined that the updated data was successfully received at the widget 401 (S337), it is further determined (S340) whether the session has optionally been terminated (such as, for example, by the widget 401 at S339).

Figure 5:
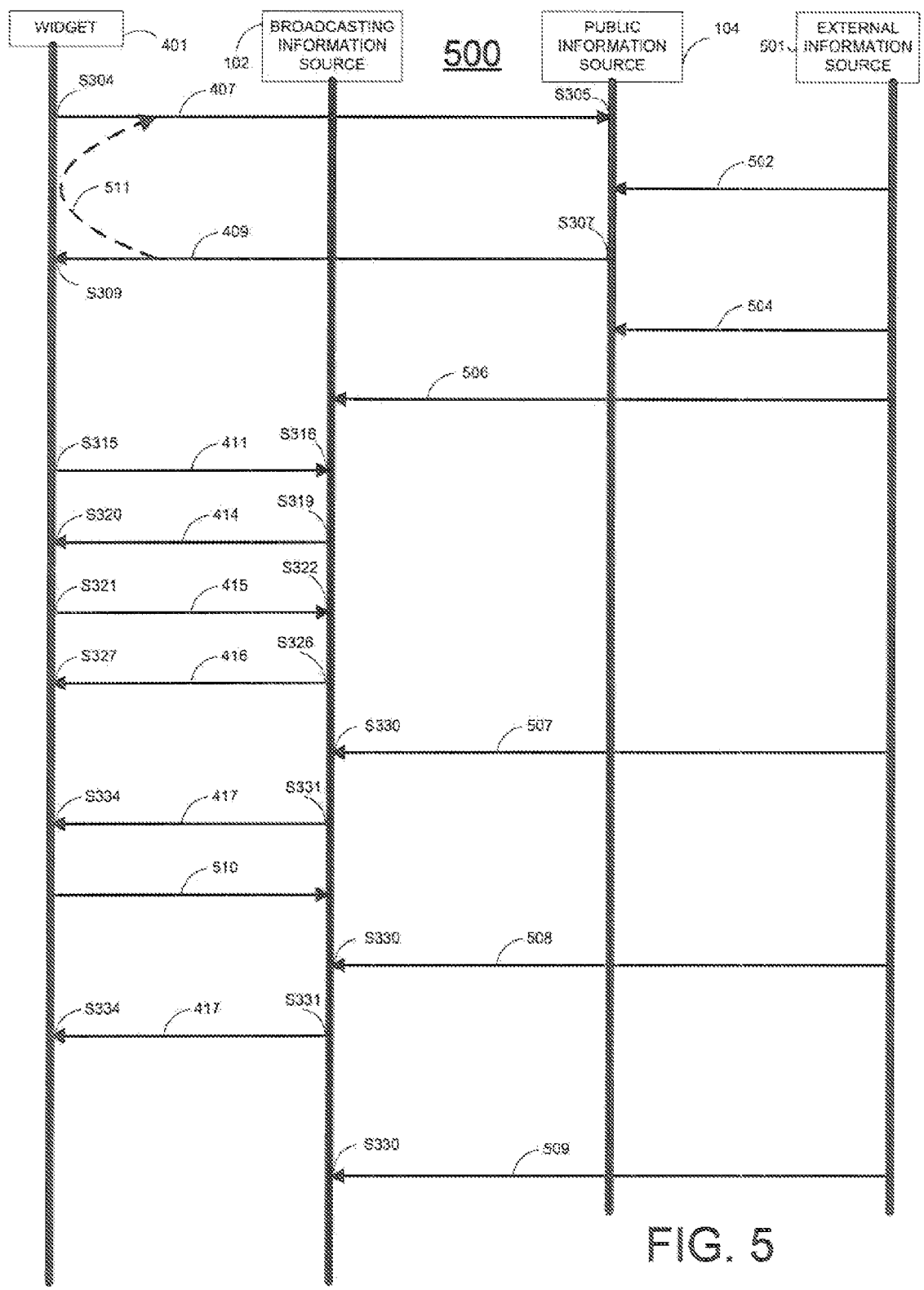
FIG. 5 is a swim diagram illustrating an exemplary data flow between components, using the exemplary process illustrated in FIGS. 3A to 3C.

If it is determined that the updated data has not successfully received at the widget (or, e.g., if it is not determined that the data has been successfully received at the widget) (S337), the subscription is unregistered (S344), thereby ending the session, and the process 300 ends (S345). In FIG. 5, for example, the failure of to receive a data successfully received signal 510 following the transmission of updated data 508 from the broadcasting information source 102 to the widget 401 causes the subscription to be unregistered, ending the session. As a result of the unsubscription in this example, updated data 509 received at the broadcasting information source 102 is not published to the widget 401. Notably, an indication that the data was not successfully received at the widget does not trigger a retransmission of the updated data, or initiate a troubleshooting process to determine the cause of the error. In doing so, computationally-expensive error checking procedures are avoided, making the widget architecture lightweight and flexible. From the perspective of the user, the terminated session may be remedied by merely restarting the widget.

If the session has been terminated (S340), the subscription is unregistered (S344), thereby ending the process 300 (S345). If the session has not been terminated (S340), it is determined (S342) whether an unsubscribe request has been received (such as, for example, by the widget at S341). The widget engine 404 can un-subscribe from the broadcasting information source 102, or the broadcasting information source 102 can unsubscribe the widget 401 based upon a first unsuccessful attempt to push updated data.

If an unsubscribe request has been received (S342), the subscription is unregistered (S344), thereby ending the process 300 (S345). If an unsubscribe request has not been received (S342), it is further determined whether additional updated data has been received (S343).

If additional updated data has been received, for example within a predetermined amount of time (S343), the updated data is received (S330). If additional updated data has not been received (S343), the subscription is unregistered (S344), thereby ending the process 300 (S345). In this regard, the subscription is unregistered at the broadcasting information source based upon determining that the updated data was not received successfully at the widget, upon termination of the session, or upon receiving an unsubscribe request.

Figure 6:
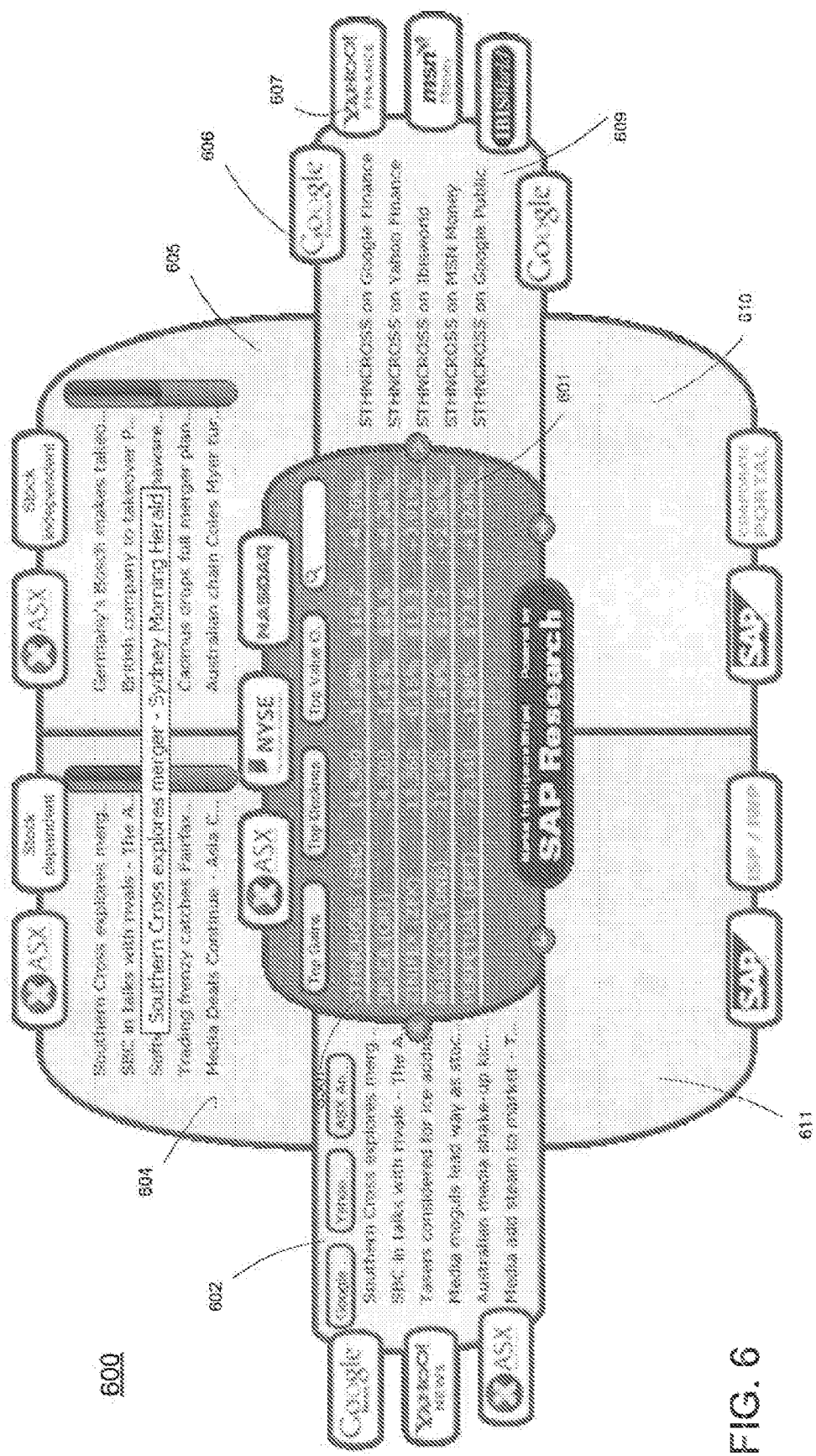
FIGS. 6 to 9 illustrate exemplary widgets, according to other general implementations.
Figure 7:
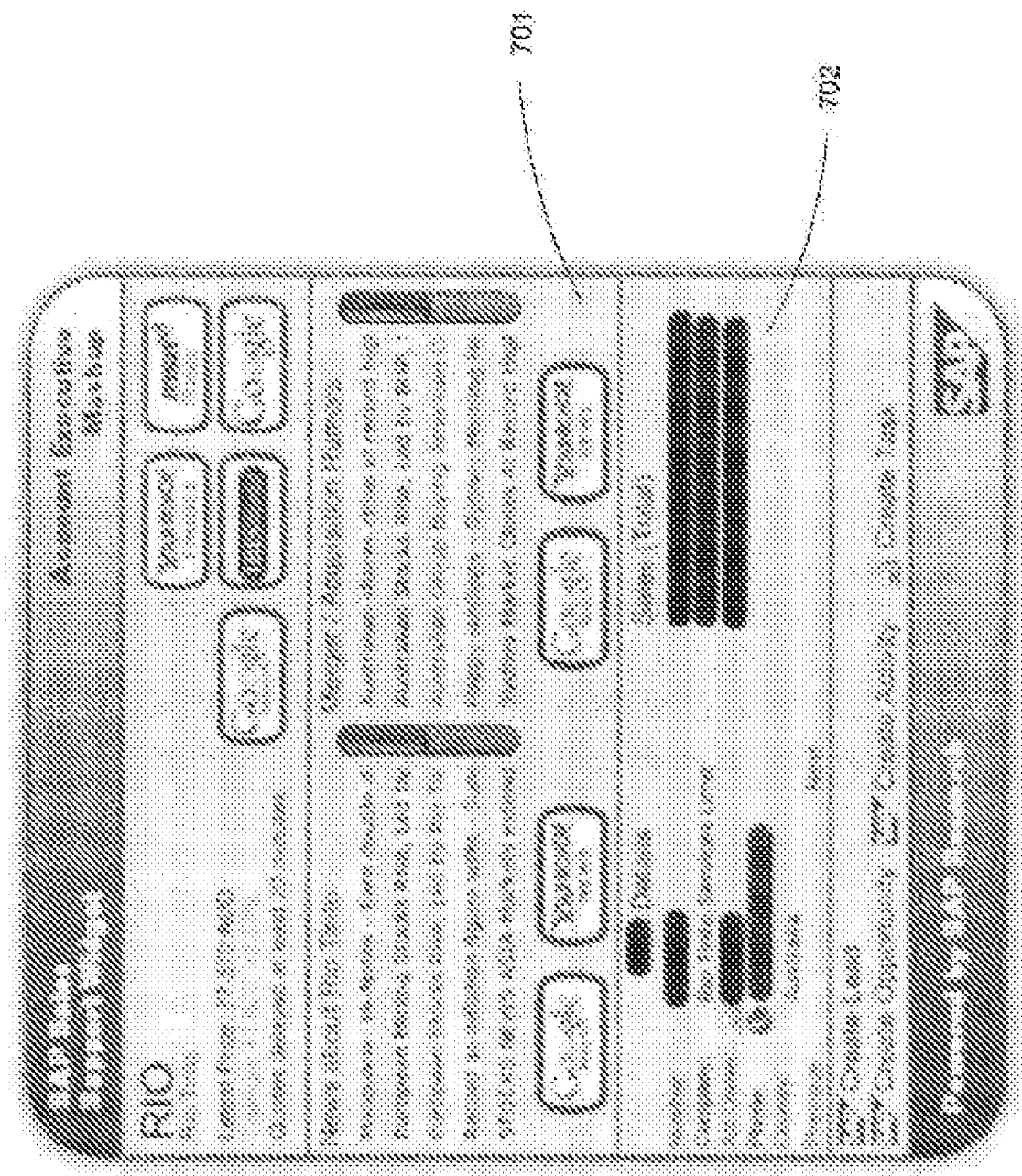

FIGS. 6 and 7 illustrate an exemplary lead generation widget 600 and an exemplary sales support widget 700, according to other exemplary general implementations. With regard to FIG. 6, lead generation is a process in sales, which can be supported by detecting discontinuities in financial markets or in the news. A discontinuity can be caused, for example, by a significant change or departure in corporate management, a staff exodus, a merger, an acquisition, or similar event, causing, sales opportunities to arise. Such events are often manifested as changes in a stock price or market value, heavy market trading volume, or the generation of news articles relating to the company.

Upon detecting a discontinuity from a public information source, the discontinuity is correlated to an enterprise-internal broadcasting information source in order to gather and present information explaining the impact of the discontinuity on the enterprise. Since news and market information changes very frequently, the detection of the discontinuity can be detected using the request/response approach. Since enterprise-internal information about a customer base may infrequently change, for example when a small order is added to an extensive customer order history, this customer base data can be incrementally accessed using the publish/subscribe approach. In this regard, the lead generation widget 700 is an example of a mash-up widget, which accesses data from internal and external sources using different data access approaches.

Accordingly, the lead generation widget 401 is initialized with information from financial market public information sources, using various stock market metrics. A list of companies matching these predetermined criteria is output in region 601 of the lead generation widget. Based upon viewing this list of companies, a user, such as a sales manager, is able to know that a discontinuity is occurring with a company, although they may not know why such a discontinuity is occurring.

By selecting one or more companies on the list of companies displayed in region 601, a user of the lead generation widget 600 can view a list of news articles relating to the selected companies, in region 602. This list of news articles allows the user of the user of the lead generation widget 600 to browse the news to look for possible causes of the discontinuity. In many cases, the user will find the cause of the discontinuity in the news, which is available from the public information source.

Since a discontinuity may also be related to rumors about mergers and acquisitions, results of a keyword search of articles, for popular keywords such as "merger," "takeover," "acquisition" or similar words may be displayed in regions 604 and 605. Based upon the information presented, in regions 602, 604 and 603, the user can determine that a discontinuity is occurring at the company, although the user may not know much about the background of the company itself.

In order to inform the user about companies identified on the list of companies in region 601, the user can select several controls, such as controls 606 or 607, to view various company listing profiles in region 609, from public Information sources such as for companies such as the GOOGLE® Finance Information source, the, YAHOOS!® Finance information source, the MSN® Money information source, or other sources. Based upon this information, the user can learn more about a company, although they might not understand the impact of this Information for their work in sales.

Based upon the accessed information, companies identified as having a discontinuity may be queried in an internal financial accounting broadcasting information source, such as an SAP® back end system. Since customer information in this type of financial accounting broadcasting information source changes infrequently, the data can be accessed using the publish/subscribe approach, using the accounting, system as the broadcasting information source.

If historical data is found in the accounting system, the company is determined to be a customer. If the company is a customer, a subscription is created to provide the user of the lead generation widget 600 with historical and/or updated data relating to the company. This data, which may include, for example, an identification of the account manager, an identification of solid products and prices, and other information, is output in region 610.

If the company is not found to be a customer a subscription is generated at a customer relationship management ("CRM") broadcasting information source to determine if the discontinuity presents an opportunity or a lead. In case the company is an opportunity or a lead, then related, data, such as an identification of a sales person, a date that contact has been established, previous offer information, or other data, is presented, in region 611.

Armed with the information output on the lead generation widget 601, the user is able to take action on the lead, in real-time or near real-time. Specifically, the lead generation widget 601 allows a user create an opportunely or a lead in the CRM broadcasting information source for this company, to write an e-mail to the account manager, to create a task to systematically build up an opportunity and assign it to the account manager, or other options. Since the lead generation widget does not rely solely upon the request/response approach, the same information is not queried over and over again, draining system resources.

FIG. 7 illustrates an exemplary sales support widget 700. The sales support widget 700 includes a modest change in the contextualizatiom of the different knowledge blocks over the lead generation widget 600, leading to the identification of different scenarios. In particular, the sales support widget 700 is particularly useful for CRM scenarios, by providing a single view on a portion or all the knowledge that a company has of a certain customer from internal sources as well as news and market information from external sources.

The market information, which is retrieved using the request/response approach from news and market public information source, is displayed in region 701 of the sales support widget 700. The CRM information, which is retrieved using the publish/subscribe approach from CRM broadcasting information sources, is displayed in region 702 of the sales support widget. Using the information displayed in regions 701 and 702, an account executive can thus stay up to date on internal and external developments with a single small desktop application.

The sales support widget 800 has a different pivotal point than the lead generation widget 600. Specifically, whereas the lead generation widget 600 is initialized with stock information, the streamlined lead generation widget 800 starts with a company that a user has identified, for example a company whose account he manages. Based upon this identified content, the historical and updated data are accessed and output.

Figure 8:
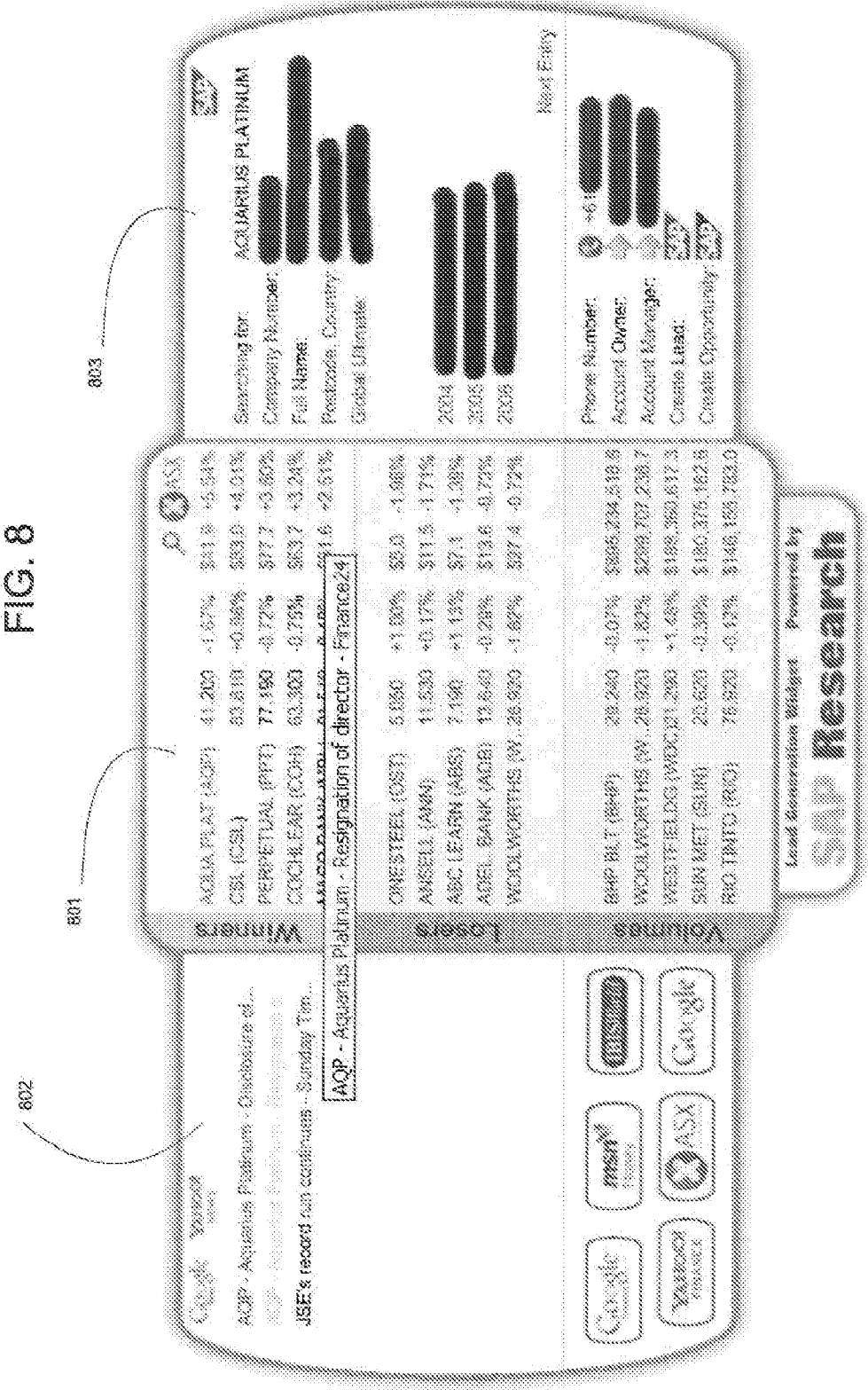

FIG. 8 illustrates an exemplary account executive 800, which is similar in function to the lead generation widget 600. The streamlined lead generation widget 800 is initialized with information from financial market public information sources, using various stock market metrics. A list of companies matching these predetermined criteria is output in region 801 of the streamlined lead generation widget 800. Based upon, viewing this list of companies, a user, such as a sales manager, is able to know that a discontinuity is occurring with a company, although they may not know why such a discontinuity is occurring.

By selecting one or more companies on the list of companies displayed in region 801, a user of the streamlined lead generation widget 800 can view a list of news articles relating to the selected companies, in region 802. This list of news articles allows the user of the user of the streamlined lead generation widget 800 to browse the news to look for possible causes of the discontinuity. In many cases, the user will find the cause of the discontinuity in the news, which is available from the public information source.

Based upon, the accessed information, companies identified as having a discontinuity may be queried in an internal financial accounting broadcasting information source, such as an SAP® back end system. Since customer information in this type of financial accounting broadcasting information source changes infrequently, the data can be accessed using the publish/subscribe approach, using the accounting system as the broadcasting information source.

If historical data is formed in the accounting system, the company is determined to be a customer. If the company is a customer, a subscription is created to provide the user of the streamlined lead generation widget 800 with historical and/or updated data relating to the company. This data, which may include, for example, an identification of the account manager, an identification of sold products and prices, and other information, is output in region 803.

If the company is not found to be a customer a subscription is generated at a customer relationship management ("CRM") broadcasting information source to determine if the discontinuity presents an opportunity or a lead. In case the company is an opportunity or a lead, then related data, such as an identification of a sales person, a date that contact has been established, previous offer information, or other data, is presented in region 803.

Armed with the information output on the streamlined lead generation widget 800, the user is able to take action on the lead. In real-time or near real-time. Specifically, the streamlined lead generation widget 800 allows a user to create an opportunity or a lead in the CRM broadcasting information source for this company, to write an e-mail to the account manager, to create a task to systematically build up an opportunity and assign it to the account manager, or other options. Since the lead generation widget does not rely solely upon the request/response approach, the same information is not queried over and over again, draining system resources.

Figure 9:
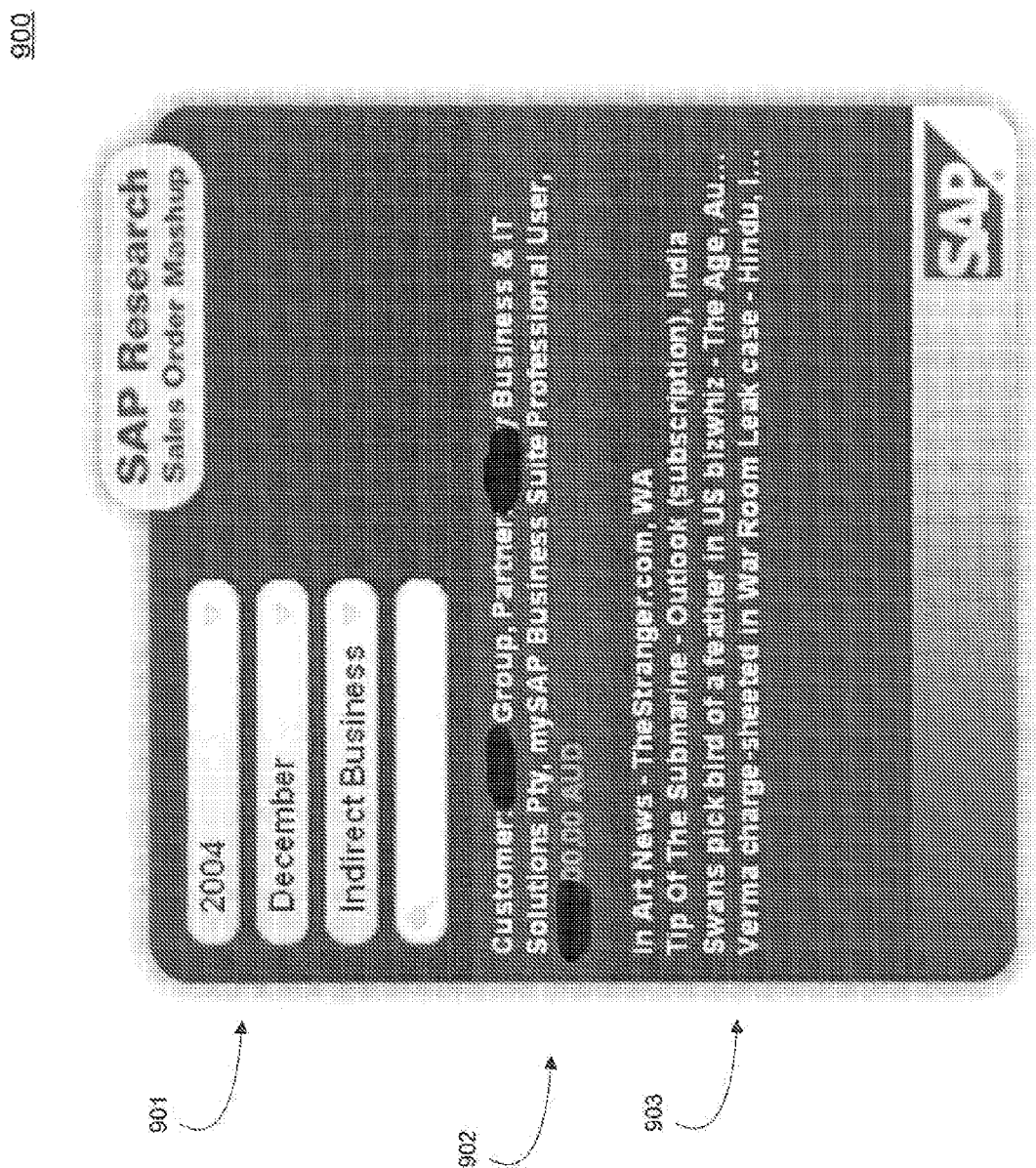

FIG. 9 illustrates an exemplary sales order widget 900. The sales support widget 900 is particularly useful for providing a single view on a portion or all the sales knowledge that a company has of a certain customer from internal sources as well as news and market information from external sources.

A user enters query data into region 901, to narrow down a field of data to those customers matching, the query data. The query data may include, a time frame, and an indication of whether a sale was made through direct or indirect business. A query is executed based, upon the query data, and customers matching the query data and associated sales order information are output in region 901. A public information source is accessed for news or market information relating to the identified companies, and the news or market information is output in region 903. Unlike the previous widgets, the exemplary sales order widget seeds the request/response accesses to the public information source based upon information first determined via publish/subscribe access to the broadcasting information source.

A number of implementations have been described. Nevertheless, it will be understood that various modifications may be made without departing from the spirit and scope of the disclosure. Accordingly, other implementations are within the scope of the following claims.

What is claimed is:

1. A method comprising:
querying a public information source for records satisfying predetermined criteria;
receiving a list of the records satisfying the predetermined criteria from the public information source, the list of the records including content;
transmitting a subscription request from a widget to a broadcasting information source, thereby establishing a session, the subscription request identifying the widget and the content;
registering a subscription at the broadcasting information source based upon the subscription request;
transmitting a service call from the widget to the broadcasting information source based upon the subscription being registered at the broadcasting information source, the service call effectuating a query for historical data associated with the content at the broadcasting information source;
receiving the historical data at the widget;
receiving updated data associated with the content at the broadcasting information source;
iteratively transmitting the updated data from the broadcasting information source based upon the subscription being registered at the broadcasting information source;
iteratively determining, at the broadcasting information source, whether the updated data was successfully received by the widget;
unregistering the subscription at the broadcasting information source based upon determining that the updated data was not received successfully at the widget, upon termination of the session, or upon receiving an unsubscribe request; and
outputting the historical data and the updated data at the widget.

2. The method of claim 1, further comprising:
determining whether the historical data is stored at the broadcasting information source,
wherein the subscription request is transmitted from the widget to the broadcasting information source based upon determining that the historical data is stored at the broadcasting information source.

3. The method of claim 1, further comprising:
receiving a user selection of the content,
wherein the subscription request is transmitted to the broadcasting information source based upon receiving the user selection of the content.

4. The method of claim 1, wherein the broadcasting information source is a back-end application.

5. The method of claim 1, wherein the historical data or the updated data is sales data or contact management data.

6. The method of claim 1, further comprising terminating the session, by the widget.

7. The method of claim 1, further comprising transmitting the unsubscribe request from the widget to the broadcasting information source.

8. The method of claim 1, wherein the subscription request identifies the widget based upon an internet protocol ("IP") address of the widget.

9. The method of claim 1, further comprising listening, at the widget, for transmission of the updated data from the broadcasting information source.

10. The method of claim 1, wherein the public information source is a financial market information source or a news information source.

11. The method of claim 1, wherein the predetermined criteria include a stock market metric.

12. The method of claim 11, wherein the content identifies a company, and wherein the predetermined criteria include a daily top gaining stock, a daily top losing stock, a top stock trade value, a top stock trade volume, or a top stock trade volume ratio.

13. A method comprising:
receiving a subscription request at a broadcasting information source from a widget, thereby establishing a session, the subscription request identifying the widget and content, the content having been received at the widget based on querying a public information source for records satisfying predetermined criteria;
registering a subscription based upon the subscription request;
receiving a service call from the widget based upon the subscription being registered, the service call effectuating a query for historical data associated with the content;
transmitting the historical data to the widget;
receiving updated data associated with the content;
iteratively transmitting the updated data to the widget based upon the subscription being registered;
iteratively determining whether the updated data was successfully received by the widget; and
unregistering the subscription based upon determining that the updated data was not received successfully at the widget, upon termination of the session, or upon receiving an unsubscribe request.

14. A system comprising:
a widget configured to:
query a public information source for records satisfying predetermined criteria;
receive a list of the records satisfying the predetermined criteria from the public information source, the list of the records including content;
transmit a subscription request, the subscription request identifying the widget and the content,
transmit a service call based upon a subscription being registered, the service call effectuating a query for historical data associated with the content,
receive the historical data at the widget, and
output the historical data and updated data at the widget;
a broadcasting information source configured to:
receive the subscription request, thereby establishing a session,
register the subscription based upon the subscription request,
receive the service call,
receive the updated data associated with the content,
iteratively transmit the updated data source based upon the subscription being registered,
iteratively determine whether the updated data was successfully received by the widget, and
unregister the subscription based upon determining that the updated data was not received successfully at the widget, upon termination of the session, or upon receiving an unsubscribe request.

15. A computer program product, tangibly embodied in a machine-readable storage medium, wherein the computer program product comprises instructions that, when read by a machine, operate to cause a data processing apparatus to:
receive a subscription request at a broadcasting information source from a widget, thereby establishing a session, the subscription request identifying the widget and content, the content having been received at the widget based on querying a public information source for records satisfying predetermined criteria;
register a subscription based upon the subscription request;
receive a service call from the widget based upon the subscription being registered, the service call effectuating a query for historical data associated with the content;
transmit the historical data to the widget;
receive updated data associated with the content;
iteratively transmit the updated data to the widget based upon the subscription being registered;
iteratively determine whether the updated data was successfully received by the widget; and
unregister the subscription based upon determining that the updated data was not received successfully at the widget, upon termination of the session, or upon receiving an unsubscribe request.

16. The method of claim 1, wherein querying the public information source and receiving the list of records is achieved using a request/response approach, in which data is regularly requested and received.

17. The method of claim 1, wherein information stored in the public information source is updated more frequently than information stored in the broadcasting information source.

18. The system of claim 14, wherein the widget is further configured to use a request/response approach, in which data is regularly requested and received, to query the public information source and receive the list of records.

19. The computer program product of claim 15 further causing the data processing apparatus to query the public information source and receive the list of records using a request/response approach, in which data is regularly requested and received.

20. The computer program product of claim 15, wherein information stored in the public information source is updated more frequently than information stored in the broadcasting information source.

* * * * *